US006815018B2

(12) United States Patent
Wexler et al.

(10) Patent No.: US 6,815,018 B2
(45) Date of Patent: Nov. 9, 2004

(54) INK JET RECORDING ELEMENT

(75) Inventors: Allan Wexler, Pittsford, NY (US); Kevin M. O'Connor, Webster, NY (US); Kurt M. Schroeder, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 143 days.

(21) Appl. No.: 10/260,665

(22) Filed: Sep. 30, 2002

(65) Prior Publication Data

US 2004/0061763 A1 Apr. 1, 2004

(51) Int. Cl.[7] .................................................. B32B 3/00

(52) U.S. Cl. ................................ 428/32.25; 428/32.21; 428/32.26; 428/32.27; 428/32.28; 428/32.3; 428/32.34

(58) Field of Search ........................... 428/32.21, 32.25, 428/32.26, 32.27, 32.28, 32.3, 32.34

(56) References Cited

U.S. PATENT DOCUMENTS

| | | | | | |
|---|---|---|---|---|---|
| 4,785,313 | A | | 11/1988 | Higuma et al. | 346/135.1 |
| 4,832,984 | A | | 5/1989 | Hasegawa et al. | 427/161 |
| 5,374,475 | A | | 12/1994 | Walchli | 428/304.4 |
| 5,712,027 | A | * | 1/1998 | Ali et al. | 428/32.3 |
| 6,114,020 | A | * | 9/2000 | Misuda et al. | 428/32.35 |
| 6,357,871 | B1 | * | 3/2002 | Ashida et al. | 347/106 |
| 6,475,603 | B1 | * | 11/2002 | Wexler | 428/32.25 |
| 6,497,480 | B1 | * | 12/2002 | Wexler | 347/102 |
| 2002/0008747 | A1 | * | 1/2002 | Kaga et al. | 347/102 |
| 2003/0059583 | A1 | * | 3/2003 | Allan | 428/195 |

FOREIGN PATENT DOCUMENTS

| | | | | | |
|---|---|---|---|---|---|
| EP | 0 858 905 | A1 | | 8/1998 | B41M/5/00 |
| EP | 1 078 775 | A2 | * | 2/2001 | B41M/5/00 |

* cited by examiner

*Primary Examiner*—B. Shewareged
(74) *Attorney, Agent, or Firm*—Harold E. Cole

(57) ABSTRACT

An ink jet recording element having a support having thereon in order: a) at least one porous, ink-retaining layer; and b) a fusible, porous ink-transporting layer of a film-forming, hydrophobic binder and fusible, polymeric particles of a cellulose ester.

20 Claims, No Drawings

INK JET RECORDING ELEMENT

CROSS REFERENCE TO RELATED APPLICATIONS

Reference is made to commonly assigned, co-pending U.S. patent applications: Ser. No. 10/260,668 by Wexler et al., filed of even date herewith, entitled Ink Jet Printing Method; and Ser. No. 09/955,549 of Wexler, filed Sep. 18, 2001, entitled Ink Jet Recording Element.

FIELD OF THE INVENTION

The present invention relates to a porous ink jet recording element.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol or mixtures thereof.

An ink jet recording element typically comprises a support having on at least one surface thereof at least one ink-receiving layer. The ink-receiving layer is typically either a porous layer that imbibes the ink via capillary action, or a polymer layer that swells to absorb the ink. Swellable hydrophilic polymer layers take an undesirably long time to dry. Porous ink-receiving layers are usually composed of inorganic or organic particles bonded together by a binder. The amount of particles in this type of coating is often far above the critical particle volume concentration, which results in high porosity in the coating. During the ink jet printing process, ink droplets are rapidly absorbed into the coating through capillary action and the image is dry-to-touch right after it comes out of the printer. Therefore, porous coatings allow for fast "drying" of the ink, and produce a smear-resistant image.

Ink jet prints, prepared by printing onto ink jet recording elements, are subject to environmental degradation. They are especially vulnerable to damage resulting from contact with water and atmospheric gases such as ozone. The damage resulting from the post imaging contact with water can take the form of water spots resulting from deglossing of the top coat, dye smearing due to unwanted dye diffusion, and even gross dissolution of the image recording layer. Ozone bleaches ink jet dyes resulting in loss of density. To overcome these deficiencies, ink jet prints are often laminated. However, lamination is expensive as it requires a separate roll of material.

U.S. Pat. Nos. 4,785,313 and 4,832,984 relate to an ink jet recording element comprising a support having thereon a fusible, ink-transporting layer and an ink-retaining layer, wherein the ink-retaining layer is non-porous. However, there is a problem with this element in that it has poor image quality.

EP 858, 905A1 relates to an ink jet recording element having a porous, outermost layer formed by heat sintering thermoplastic particles such as polyurethane which may contain a slight amount of a hydrophilic binder such as poly(vinyl alcohol). However, there is a problem with this element in that it has poor resistance to mechanical abrasion when it does not contain a hydrophilic binder, and poor water-resistance when it does contain a hydrophilic binder.

U.S. Pat. No. 5,374,475 relates to a record carrier for the receipt of coloring materials comprising a support having thereon an uppermost, porous layer containing particles of a plastic material which may be melted together at their mutual contact areas. While there is a disclosure in this patent of a double layer assembly on the support, the lower layer is not porous since it is described as a layer that absorbs ink via diffusion (Col. 6, lines 3–5). Ink applied to such an element can spread laterally in the porous top layer, resulting in poorer image quality as compared to an element with a porous underlayer as described herein. In addition, there is no disclosure in this patent of the use of a film-forming, hydrophobic binder in this layer, the absence of which results in poor abrasion resistance prior to fusing.

In application Ser. No. 09/955,549 of Wexler, filed Sep. 18, 2001, referred to above, ink jet recording elements are obtained which are useful for the intended purpose. However, there is a problem with such elements after printing and storing under high temperature conditions, in that they tend to block or stick to one another.

It is an object of this invention to provide an inkjet recording element having a fusible protective uppermost layer and ink-retaining underlayer which can be printed with ink jet inks without bleed. It is another object of the invention to provide a porous ink-transporting layer that has good mechanical integrity and is abrasion resistant. It is another object of the invention to provide a protective uppermost ink-transporting layer that is thermally fusible and thereby can be rendered water resistant. It is another object to provide an inkjet recording element that can be thermally fused to provide high density of the printed image. It is another object to provide an ink jet recording element which does not block after printing and storing under high temperature conditions.

SUMMARY OF THE INVENTION

These and other objects are achieved in accordance with the invention which comprises an ink jet recording element comprising a support having thereon in order:

a) at least one porous, ink-retaining layer; and b) a fusible, porous ink-transporting layer comprising a film-forming, hydrophobic binder and fusible, polymeric particles of a cellulose ester.

By use of the invention, a porous ink jet recording element is obtained that has good abrasion resistance, and which when printed with an ink jet ink and subsequently fused, has good water-resistance, high print density and does not block after storing under high temperature conditions.

DETAILED DESCRIPTION OF THE INVENTION

The fusible, polymeric particles employed in the invention may have any particle size provided they will form a porous layer. In a preferred embodiment of the invention, the particle size of the fusible, polymeric particles may range from about 0.5 to 10 μm. The particles may be formed from any cellulose ester, such as, for example, cellulose acetate, cellulose acetate propionate or cellulose acetate butyrate.

It is desirable that fused prints not stick to each other, i.e., block, even under conditions where they are stored face-to-face at high temperatures, e.g., up to about 70° C. If the glass transition temperature, Tg, of the polymer comprising the fused polymeric particles is greater than about 70° C., it is believed that such fused prints would not exhibit thermal blocking.

Ink jet inks contain organic solvents which function in a variety of ways such as humectants, penetrants, viscosity modifiers etc. After jetting, these organic solvents in the ink can be plasticizers, which would lower the Tg, of many organic polymers which would otherwise be useful as fusible polymeric particles in a receiver. The resultant decrease in Tg would lead to undesirable thermal blocking. The cellulose esters used in the invention are surprisingly not highly plasticized by many of the organic solvents found in ink jet inks, and do not exhibit thermal blocking.

The film-forming, hydrophobic binder useful in the invention can be any film-forming hydrophobic polymer capable of being dispersed in water. In a preferred embodiment of the invention, the hydrophobic binder is an aqueous dispersion of an acrylic polymer or a polyurethane. In another preferred embodiment, the particle size of the particles in the dispersion of the film-forming hydrophobic binder is less than about 0.5 μm. When the size of the binder particle is larger, the fused layer exhibits thermal deglossing, a phenomena characterized by a decrease in gloss upon heating. It is believed that the film segments formed from the binder particles relax upon heating thereby roughening the surface of the fused layer. The roughened surface scatters light and thereby decreases the gloss. If the starting particles are smaller than 0.5 μm, it is believed that scale of the surface disruption and the resultant scatter is below the visual threshold.

The particle-to-binder ratio of the particles and binder employed in the ink-transporting layer can range between about 98:2 and 60:40, preferably between about 95:5 and 80:20. In general, a layer having particle-to-binder ratios above the range stated will usually not have sufficient cohesive strength; and a layer having particle-to-binder ratios below the range stated will usually not be sufficiently porous to provide good image quality.

The ink-retaining layer can be any porous structure, but it is preferred that the mean pore radius is smaller than the uppermost ink-transporting layer. Thus, if the ink-retaining layer is composed of particles and binder, the particles will be significantly smaller than the fusible, polymeric particles in the upper ink-transporting layer, thereby assuring a correct pore-size hierarchy.

In general, the ink-retaining layer or layers will have a thickness of about 1 μm to about 50 μm, and the top ink-transporting layer will usually have a thickness of about 2 μm to about 50 μm. In a preferred embodiment, the ink-retaining layer is present in an amount from about 1 $g/m^2$ to about 50 $g/m^2$, preferably from about 5.0 $g/m^2$ to about 30 $g/m^2$.

In a preferred embodiment of the invention, the ink-retaining layer is a continuous, co-extensive porous layer which contains organic or inorganic particles. Examples of organic particles which may be used include core/shell particles such as those disclosed in U.S. Ser. No. 09/608,969 of Kapusniak et al., filed Jun. 30, 2000, and homogeneous particles such as those disclosed in U.S. Ser. No. 09/608,466 of Kapusniak et al., filed Jun. 30, 2000, the disclosures of which are hereby incorporated by reference. Examples of organic particles which may be used include acrylic resins, styrenic resins, cellulose derivatives, polyvinyl resins, ethylene-allyl copolymers and polycondensation polymers such as polyesters.

Examples of inorganic particles which may be used in the ink-retaining layer of the invention include silica, alumina, titanium dioxide, clay, calcium carbonate, barium sulfate, or zinc oxide.

In a preferred embodiment of the invention, the porous ink-retaining layer comprises from about 20% to about 100% of particles and from about 0% to about 80% of a polymeric binder, preferably from about 80% to about 95% of particles and from about 20% to about 5% of a polymeric binder. The polymeric binder may be a hydrophilic polymer such as poly(vinyl alcohol), poly(vinyl pyrrolidone), gelatin, cellulose ethers, poly(oxazolines), poly(vinylacetamides), partially hydrolyzed poly(vinyl acetate/vinyl alcohol), poly(acrylic acid), poly(acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan and the like. Preferably, the hydrophilic polymer is poly(vinyl alcohol), hydroxypropyl cellulose, hydroxypropyl methyl cellulose, a poly(alkylene oxide), poly(vinyl pyrrolidinone), poly(vinyl acetate) or copolymers thereof or gelatin.

Suitable porous materials for an ink-retaining layer include, for example, silica or alumina in a polymeric binder. In a preferred embodiment, the ink-retaining layer is porous fumed alumina in a crosslinked poly(vinyl alcohol) binder.

In order to impart mechanical durability to an ink jet recording element, crosslinkers which act upon the binder discussed above may be added in small quantities. Such an additive improves the cohesive strength of the layer. Crosslinkers such as carbodiimides, polyfunctional aziridines, aldehydes, isocyanates, epoxides, polyvalent metal cations, vinyl sulfones, pyridinium, pyridylium dication ether, methoxyalkyl melamines, triazines, dioxane derivatives, chrom alum, zirconium sulfate and the like may be used. Preferably, the crosslinker is an aldehyde, an acetal or a ketal, such as 2,3-dihydroxy-1,4-dioxane.

The porous ink-retaining layer can also comprise an open-pore polyolefin, an open-pore polyester or an open pore membrane. An open pore membrane can be formed in accordance with the known technique of phase inversion. Examples of a porous ink-receiving layer comprising an open-pore membrane are disclosed in U.S. Ser. No. 09/626,752 and U.S. Ser. No. 09/626,883, both of Landry-Coltrain et al., filed Jul. 27, 2000.

In another preferred embodiment of the invention, two porous, ink-retaining layers are present. In this embodiment, the uppermost layer is substantially the same as the lower layer, but at a thickness of only 1% to 20% of the thickness of the lower layer, and also contains from about 1–20% by weight of a mordant, such as a cationic latex mordant.

The two porous, ink-retaining layers can be coated simultaneously or sequentially by any of the known coating techniques as noted below. The dye image is then concentrated at the thin uppermost ink-retaining layer containing a mordant, and thereby enhances print density.

The support used in the ink jet recording element of the invention may be opaque, translucent, or transparent. There may be used, for example, plain papers, resin-coated papers, various plastics including a polyester resin such as poly(ethylene terephthalate), poly(ethylene naphthalate) and poly(ester diacetate), a polycarbonate resin, a fluorine resin such as poly(tetra-fluoro ethylene), metal foil, vinyl, fabric, laminated or coextruded supports, various glass materials, and the like. In a preferred embodiment, the support is a resin-coated paper. The thickness of the support employed in the invention can be from about 12 to about 500 μm, preferably from about 75 to about 300 μm.

If desired, in order to improve the adhesion of the base layer to the support, the surface of the support may be corona-discharge-treated prior to applying the base layer or solvent-absorbing layer to the support.

Since the image recording element may come in contact with other image recording articles or the drive or transport mechanisms of image recording devices, additives such as surfactants, lubricants, UV-absorbing agents, matte particles and the like may be added to the element to the extent that they do not degrade the properties of interest.

The layers described above, including the base layer and the top layer, may be coated by conventional coating means onto a support material commonly used in this art. Coating methods may include, but are not limited to, wound wire rod coating, slot coating, slide hopper coating, gravure, curtain coating and the like. Some of these methods allow for simultaneous coatings of both layers, which is preferred from a manufacturing economic perspective.

After printing on the element of the invention, the fusible, porous ink-transporting layer is heat and/or pressure fused to form an overcoat layer on the surface. Fusing is preferably accomplished by contacting the surface of the element with a heat fusing member, such as a fusing roller or fusing belt. Thus, for example, fusing can be accomplished by passing the element through a pair of heated rollers, heated to a temperature of about 60° C. to about 160° C., using a pressure of 5 to about 15 MPa at a transport rate of about 0.005 m/sec to about 0.5 m/sec.

Ink jet inks used to image the recording elements of the present invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

The following examples further illustrate the invention.

EXAMPLES

Example 1

Synthesis of Control Polyurethane Polymer

Into a 2 liter resin flask equipped with a thermometer, stirrer, water condenser and vacuum outlet was added 6.5 g (0.0485 mole) 2,2-bis(hydroxymethyl)propionic acid, 47.91 g (0.4515 mole) diethylene glycol, 150 g reagent-grade ethyl acetate, and 0.41 g Fascat® 2003 catalyst (Atochem Co.). The temperature was raised to 78° C. until stirring until the solution cleared, then cooled to 70° C. While stirring, 111.2 g (0.5 mole) of isophrone diisocyanate and 10 g ethyl acetate were added. The temperature was raised to 76° C. and the reaction stirred at temperature until completion. Upon cooling, ethyl acetate and isopropyl alcohol were added to give a final solution by weight of 30% solids, 55% ethyl acetate, and 15% isopropyl alcohol.

Synthesis of Control Polyacrylate Polymer

The polymer was prepared by a solution polymerization technique. 13.75 g of methyl methacrylate, 11.25 g of ethyl methacrylate, 0.06 g of initiator azobisisobutryronitrile, AIBN, and 75 g of ethyl acetate were first charged to a 500 ml 3-neck flask equipped with a nitrogen inlet, mechanical stirrer and condenser. The flask was immersed in a constant temperature bath at 80° C. and purged with nitrogen for 20 min. Then 30 g of methyl methacrylate, 70 g of ethyl methacrylate, 0.25 g of initiator AIBN, and 300 g of ethyl acetate were continuously fed to the reactor over a period of 2 hours with continuous agitation. The polymerization was continued for another 3 hours after the feeding of the above mixture. The polymer was cooled to room temperature.

Preparation of Control Polyurethane Particles—CP1

To 207 g of the organic solution resulting from the control polyurethane polymer was added 2.76 g of triethanol amine. An aqueous solution was prepared by mixing 7.5 g of ethyl acetate and 382.8 g of deionized water and heating to 68° C. The aqueous phase was added to the organic phase with vigorous mixing and then subjected to a high shear Silverson mixer for 2 minutes at 5000 rpm to form an emulsified polyurethane particle premix. The resulting premix was rotary evaporated at 68° C. under vacuum to remove the volatile organic solvents to form the final polyurethane particle dispersion having a particle size of 2.3 μm as determined using a Horiba LA-920 Particle Size Analyzer.

Preparation of Control Polyacrylate Particles—CP2

The control polyacrylate polymer was adjusted with ethyl acetate to 20.6% solids with additional ethyl acetate. An aqueous solution was prepared by dissolving 16.2 g of a 10% solution of Alkanol XC (DuPont) in 751.6 g of deionized water. The organic phase was added to the aqueous phase with vigorous mixing and then subjected to a high shear Silverson mixer for 2 minutes at 6000 rpm to form an emulsified polyacrylic particle premix. The resulting premix was rotary evaporated at 68° C. under vacuum to remove the volatile organic solvents to form the final polyacrylic particle dispersion, having a particle size of 2.1 μm as determined using a Horiba LA-920 Particle Size Analyzer.

Preparation of Inventive Particles—P1

An ethyl acetate solution was prepared by dissolving 92.25 g of cellulose acetate butyrate (Eastman Chemical Company CAB-551-0.2) in 153.75 g of ethyl acetate at 65° C. with stirring. An aqueous solution was prepared combining 24 g of a 10% solution of Calfax DB-45® (Pilot Chemical Company) surfactant and 330 g of water and heated to 65° C. The aqueous phase composition was added to the organic phase composition while mixing vigorously with a propeller mixer and then converted to a crude emulsion by homogenizing for 2 minutes with a Silverson rotor-stator mixer at 5000 rpm. The crude emulsion was passed through a Microfluidics® Model 110F Microfluidizer one time at 31 MPa and collected in a round bottom flask. Rotary evaporation of the homogenized mixture at 65° C. under vacuum to remove the ethyl acetate gave a dispersion of cellulose acetate butyrate particles dispersed in water, with a particle size of 1.0 μm as determined using a Horiba LA-920 Particle Size Analyzer.

Preparation of Inventive Particles—P2

These particles were prepared the same as P1 except that Calfax 10L-45 (Pilot Chemical Company) surfactant was used instead of Calfax DB-45®. The particles had a particle size of 1.9 μm as determined using a Horiba LA-920 Particle Size Analyzer.

Preparation of Hydrophobic, Film-Forming Binders

The following hydrophobic, film-forming binders were employed in the ink-transporting layer:

Binder B1: Witcobond W-320® (Uniroyal Chemical Co.), an aqueous dispersion of polyurethane particles with particle size 1.9 μm and glass transition temperature Tg=−12° C.

Binder B2: H1R069 (Specialty Polymers, Inc), a vinyl acrylic emulsion polymer latex with particle size 1.02 μm and Tg=32° C.

Binder B3: a vinyl acrylic emulsion polymer latex of 90 parts by weight of vinylidene chloride and 10 parts ethyl acrylate, with particle size 0.52 μm and Tg=12° C.

Binder B4: Witcobond W-232® (Uniroyal Chemical Co.), an aqueous dispersion of polyurethane particles with particle size 0.12 μm and glass transition temperature Tg=−20° C.

Preparation of Porous Ink-Retaining Lower Layers—LL

A polyethylene resin-coated paper support was corona discharge treated. The support was then hopper coated and force air dried at 60° C. to provide a two-layer structure comprising a 38 μm thick under layer comprising 87% by weight of fumed alumina, 9% poly(vinyl alcohol) and 4% dihydroxydioxane crosslinking agent, and a 2 μm-thick upper layer comprising 87% by weight of fumed alumina, 8% 100 nm colloidal latex dispersion of divinylbenzene-co-N-vinylbenzyl-N,N,N-trimethylammonium chloride, 6% poly(vinyl alcohol), and 1% Zonyl ®FSN surfactant (DuPont Corp.).

Element 1 of the Invention

An aqueous 20% solids dispersion was prepared by combining 90 parts fusible particle P1 and 10 parts binder B1 on the basis of dry weight. After pre-wetting the LL with water and removing any excess water, this dispersion was hopper coated at a wet application rate of 43.0 $cm^3/m^2$ over the LL to form Element 1.

Control Element C-1

This element was prepared the same as Element 1 except that particles CP-1 were used instead of P1.

Control Element C-2

This element was prepared the same as Element 1 except that particles CP-2 were used instead of P1.

Fusing

After printing, the above elements were fused in a heated nip formed by contact between a steel roller and a silicone rubber roller at 150° C. and a pressure of 4.2 $kg/cm^2$, at a transport speed of 76 cm/min. The steel roller was wrapped with a sol-gel coated polyimide belt such that fusing of the element occurred in contact with the belt.

Printing of Thermal Blocking Test Target

A test target useful for thermal blocking tests was printed with a Hewlett-Packard Photosmart® printer using best mode, glossy photographic paper setting and print cartridges C3844A and C3845A. The target consisted of 3 $cm^2$ color patches at 100% density in each of the primary and secondary colors and black, with unprinted areas in between the color patches.

Evaluation of Thermal Blocking

The thermal blocking test target was cut into two 7.6 cm by 7.6 cm pieces, each containing areas of primary and secondary colors as well as unprinted areas. These pieces were stacked with the printed sides in face-to-face contact, and this assembly was placed in a humidity-controlled oven chamber at 70° C. and 50% RH. A weight of 1 kg was applied over the printed areas for a period of 6 hours. The printed surfaces were then examined for blocking or adhesive sticking in both printed and unprinted areas, and evaluated using the following standards with the results shown in Table 1 below:

5: No damage, sticking or audible sound when the prints were separated.

4: No sticking in the unprinted areas, but audible separation or slight damage in the printed areas.

3: No sticking in the unprinted areas, but moderate damage in the printed areas.

2: Slight damage in the unprinted areas, and complete adhesion in the printed areas.

1: Complete adhesion in all areas.

A rating of 5 or 4 is judged to be acceptable for thermal blocking resistance.

Evaluation of Print Cracking

The resistance of finished prints to cracking was evaluated by wrapping a print around a 0.635 cm diameter mandrel, with the printed side outward. After the test, an area was spotted with a Ponceau Red dye solution (one part dye in 1000 parts of a 95:5 water:acetic acid mixture) to reveal cracks by virtue of the dye staining the ink-retaining layer through ionic interactions. The prints were evaluated using the following standards and the results shown in Table 1 below:

5: No evidence of cracks.

4: Occasional, discontinuous cracks.

3: Numerous, discontinuous cracks.

2: Occasional, continuous cracks.

1: Numerous, continuous cracks.

TABLE 1

| Element | Particles | Binder | Thermal Blocking | Print Cracking |
|---|---|---|---|---|
| C-1 | CP1 | B1 | 3 | 3 |
| C-2 | CP2 | B1 | 5 | 2 |
| 1 | P1 | B1 | 5 | 5 |

The above results show that the element of the invention was acceptable for thermal blocking resistance and had no print cracking, as compared to the control elements which were worse in one or both of these properties.

Example 2

Control Element C-3

This element was prepared the same as Element 1 except that particles CP-2 were used instead of P1.

Elements 2–5 of the Invention

These elements were prepared the same as Element 1 except that particles P-2 were used instead of P1 and binders B1, B2, B3 and B4 were used, respectively.

Fusing

The above elements were fused the same as in Example 1.

Printing of Thermal Deglossing Test Target

A test target useful for thermal deglossing tests was printed the same as in Example 1.

Evaluation of Thermal Deglossing

The above elements were placed in a humidity-controlled oven chamber at 70° C. and 50% RH for a period of 6 hours. The 20 degree gloss was measured both before and after this treatment, using a BYK Gardner Micro-Tri-Gloss instrument, in each color patch as well as in unprinted areas. A decrease of less than 5 units in 20 degree gloss, for all colors and unprinted areas, is judged to be acceptable for thermal deglossing resistance. The following results were obtained:

TABLE 2

| Ele- | | Initial | Final Gloss | | | | | | |
|---|---|---|---|---|---|---|---|---|---|
| ment | Binder | Gloss | Dmin | C | M | Y | R | G | B |
| C-3 | None | 75.3 | 73.0 | 74.7 | 75.8 | 73.8 | 72.6 | 74.0 | 71.1 |
| 2 | B1 | 68.5 | 61.5 | 48.5 | 47.0 | 55.0 | 44.2 | 37.5 | 40.9 |
| 3 | B2 | 64.5 | 54.8 | 37.7 | 31.6 | 39.3 | 25.7 | 25.3 | 26.9 |
| 4 | B3 | 74.5 | 74.0 | 71.2 | 72.5 | 75.0 | 74.1 | 72.6 | 71.0 |
| 5 | B4 | 71.5 | 72.4 | 74.6 | 75.8 | 75.5 | 74.4 | 73.1 | 73.7 |

The above results show that Control Element C-3 without binder exhibited no thermal deglossing effects, as compared to Elements 4 and 5 of the invention. However, C-3 had other problems as shown in Example 3.

Example 3

Control Element C-4

This element was prepared the same as Control Element C-3.

Elements 6–11 of the Invention

These elements were prepared the same as Element 5, except that the ratio of particle P2 to binder B4 was varied, as shown in Table 3.

Fusing

The above elements of this Example were fused the same as in Example 1.

Printing of Image Bleed Test Target

A bleed test target was printed with a Hewlett-Packard Photosmart® printer using best mode, glossy photographic paper setting and print cartridges C3844A and C3845A. The target design had seven adjacent 9 mm by 48 mm rectangular bars, each bar was one of the primary or secondary subtractive color, i.e., C,M,Y,R,G,B,K, and in each bar was embedded six 7 mm squares of the other colors. So, for example, the Cyan bar had embedded squares of M, Y, R, G, B and K Evaluation of Image Bleed The printed elements were then examined for bleed with the following evaluation standards and the results shown in Table 3 below:

5: No change in the shape of the embedded squares with sharp edges of the squares maintained 3: The square pattern was slightly rounded with smooth edges 1: Major spreading and deformation of the rectangular pattern with ragged edges.

An evaluation of 5 or 3 is necessary for good image quality. The following results were obtained:

TABLE 3

| Element | Particle-to-Binder Ratio | Image Bleed | Cracking |
|---|---|---|---|
| C-4 | 100:0 | 5 | 3 |
| 6 | 95:5 | 5 | 4 |
| 7 | 90:10 | 5 | 5 |
| 8 | 85:15 | 5 | 5 |
| 9 | 80:20 | 3 | 5 |
| 10 | 75:25 | 3 | 5 |
| 11 | 70:30 | 1 | 5 |

The above results show that control Element C-4 without binder had unacceptable cracking resistance, as compared to the elements of the invention.

Although the invention has been described in detail with reference to certain preferred embodiments for the purpose of illustration, it is to be understood that variations and modifications can be made by those skilled in the art without departing from the spirit and scope of the invention.

What is claimed is:

1. An ink jet recording element comprising a support having thereon in order:

a) at least one porous, ink-retaining layer; and b) a fusible, porous ink-transporting layer comprising a film-forming, hydrophobic binder and fusible, polymeric particles of a cellulose ester.

2. The element of claim 1 wherein said ink-transporting layer is prepared by coating on said ink-retaining layer an aqueous dispersion of said fusible, polymeric particles and particles of said film-forming, hydrophobic binder, followed by drying.

3. The element of claim 2 wherein the size of the hydrophobic binder particles in said aqueous dispersion is less than 0.5 μm and the mean pore radius of said ink-transporting layer is greater than that that of the ink-retaining layer.

4. The element of claim 1 wherein the particle size of said fusible, polymeric particles is from about 0.5 to about 10 μm.

5. The element of claim 1 wherein the particle-to-binder ratio of the ink-transporting layer is between about 95:5 and 75:25.

6. The element of claim 1 wherein said porous, ink-retaining layer comprises from about 20% to about 100% of particles and from about 80% to about 0% of a polymeric binder.

7. The element of claim 1 wherein said porous ink-retaining layer comprises from about 50% to about 95% of particles and from about 50% to about 5% of a polymeric binder.

8. The element of claim 6 wherein said particles comprise silica, alumina, titanium dioxide, clay, calcium carbonate, barium sulfate or zinc oxide.

9. The element of claim 6 wherein said polymeric binder is poly(vinyl alcohol), hydroxypropyl cellulose, hydroxypropyl methyl cellulose, a poly(alkylene oxide), poly(vinyl pyrrolidinone), poly(vinyl acetate) or copolymers thereof, or gelatin.

10. The element of claim 1 wherein said porous, ink-retaining layer contains organic particles.

11. The element of claim 10 wherein said organic particles are fusible.

12. The element of claim 1 wherein said porous ink-retaining layer comprises a polymeric open-pore membrane.

13. The element of claim 1 wherein said at least one ink-retaining layer comprises fumed alumina, crosslinked poly(vinyl alcohol) and colloidal alumina.

14. The element of claim 1 wherein said ink-transporting layer has a thickness of about 1 μm to about 25 μm and said ink-retaining layer has a thickness of about 2 μm to about 50 μm.

15. The element of claim 1 wherein said support is resin-coated paper.

16. The element of claim 1 wherein said fusible, polymeric particles comprises cellulose acetate, cellulose acetate propionate or cellulose acetate butyrate.

17. The element of claim 1 wherein said hydrophobic binder comprises a polyurethane, an acrylic polymer or a vinylic polymer.

18. The element of claim 1 wherein said ink-retaining layer comprises a multiple layer structure wherein the outermost layer is thinner than the undermost layer(s).

19. The element of claim 18 wherein said outermost layer contains a mordant.

20. The element of claim 18 wherein said outmost layer of said multiple layer structure is fusible.

* * * * *